(12) United States Patent
Ha et al.

(10) Patent No.: US 9,189,100 B2
(45) Date of Patent: Nov. 17, 2015

(54) TOUCH SCREEN PANEL WITH INTEGRATED TOUCH AND DATA DRIVERS

(75) Inventors: Sang-Kwon Ha, Yongin (KR); Joo-Hyung Lee, Yongin (KR); Sang-Jin Pak, Yongin (KR); Ji-Gong Lee, Yongin (KR); Hee-Chul Hwang, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 645 days.

(21) Appl. No.: 13/454,934

(22) Filed: Apr. 24, 2012

(65) Prior Publication Data

US 2012/0313866 A1 Dec. 13, 2012

(30) Foreign Application Priority Data

Jun. 10, 2011 (KR) .................. 10-2011-0055878

(51) Int. Cl.
*G06F 3/041* (2006.01)
*G06F 3/044* (2006.01)
*G09G 3/36* (2006.01)

(52) U.S. Cl.
CPC .............. *G06F 3/0416* (2013.01); *G06F 3/044* (2013.01); *G09G 3/3692* (2013.01); *G09G 3/3696* (2013.01)

(58) Field of Classification Search
CPC ....... G06F 3/044; G06F 3/041; G06F 3/0416; G06F 3/0488; G09G 3/3688; G09G 3/3696

USPC .......................................... 345/173
See application file for complete search history.

(56) References Cited

U.S. PATENT DOCUMENTS

| | | | |
|---|---|---|---|
| 2007/0182693 A1* | 8/2007 | Kwon et al. | 345/100 |
| 2008/0062139 A1* | 3/2008 | Hotelling et al. | 345/173 |
| 2009/0122034 A1* | 5/2009 | Shin et al. | 345/204 |
| 2009/0146964 A1* | 6/2009 | Park et al. | 345/173 |
| 2010/0201666 A1* | 8/2010 | Tobita | 345/208 |
| 2010/0214232 A1* | 8/2010 | Chan et al. | 345/173 |
| 2010/0295804 A1 | 11/2010 | Takeuchi et al. | |
| 2011/0157132 A1* | 6/2011 | Byun et al. | 345/211 |
| 2011/0260992 A1* | 10/2011 | Hung et al. | 345/173 |
| 2011/0298737 A1* | 12/2011 | Maeda et al. | 345/173 |
| 2012/0206383 A1 | 8/2012 | Ha et al. | |

FOREIGN PATENT DOCUMENTS

| | | |
|---|---|---|
| KR | 10-2010-0048236 A | 5/2010 |
| KR | 10-2010-0124658 A | 11/2010 |
| KR | 10-2012-0091878 A | 8/2012 |

* cited by examiner

*Primary Examiner* — John Kirkpatrick
(74) *Attorney, Agent, or Firm* — Knobbe, Martens, Olson & Bear, LLP

(57) ABSTRACT

A touch screen panel is disclosed. The touch screen panel includes a pixel unit, a touch sensing unit, and a data driver configured to provide data voltages to the pixel unit and to provide driving signals to the touch sensing unit.

10 Claims, 5 Drawing Sheets

TOUCH SCREEN PANEL WITH INTEGRATED TOUCH AND DATA DRIVERS

CROSS-REFERENCE TO RELATED APPLICATIONS

This application claims priority to and the benefit of Korean Patent Application No. 10-2011-0055878, filed on Jun. 10, 2011, in the Korean Intellectual Property Office, the entire content of which is incorporated herein by reference.

BACKGROUND

1. Field

The disclosed technology relates to a touch screen panel, and more particularly, to a touch screen panel having a touch sensing system that does not need an additional boosting circuit.

2. Description of the Related Technology

A touch screen panel is an input device that displays an image and that recognizes touch of the hand of a user or an object to receive the command of the user. Since the touch screen panel may replace another input device coupled to an image display device to operate such as a keyboard and a mouse, the use range of the touch screen panel is gradually increasing. Methods of realizing a touch screen panel include a resistance layer method, a photo-sensing method, and an electrostatic capacity method.

A touch screen panel using the electrostatic capacity method includes sensing electrodes dispersed into a touch active region to detect the point where electrostatic capacity changes when a hand or an object contacts the touch screen panel and to sense a contact position.

However, in a conventional touch screen panel, a touch controller for controlling touch driving and a timing controller for controlling image display are independently driven without being synchronized with each other so that a touch sensing characteristic suffers.

SUMMARY OF CERTAIN INVENTIVE ASPECTS

One inventive aspect is a touch screen panel. The panel includes a pixel unit having pixels coupled to scan lines and data lines, a touch sensing unit having driving electrodes and sensing electrodes, and a scan driver configured to supply scan signals to the pixels through the scan lines. The panel also includes a data driver having a data voltage outputting unit configured to receive a plurality of gray level voltages, generate data voltages based on the gray level voltages and corresponding to image data, and supply the data voltages to the pixels through the data lines. The data driver also has a driving signal outputting unit configured to supply driving signals to the driving electrodes. The panel also includes a touch controller configured to detect sensing signals output from the sensing electrodes.

Another inventive aspect is a touch screen panel. The panel includes a pixel unit configured to display an image according to image data, a touch sensing unit including driving electrodes and sensing electrodes, and a data driver configured to provide image data to the pixel unit and to provide driving signals to the driving electrodes. The panel also includes a touch controller configured to detect sensing signals from the sensing electrodes, where timing of both the image data and the driving signals is based on a synchronizing signal.

BRIEF DESCRIPTION OF THE DRAWINGS

The accompanying drawings, together with the specification, illustrate exemplary embodiments, and, together with the description, serve to explain various aspects and principles.

DETAILED DESCRIPTION OF CERTAIN INVENTIVE EMBODIMENTS

Figure 1:
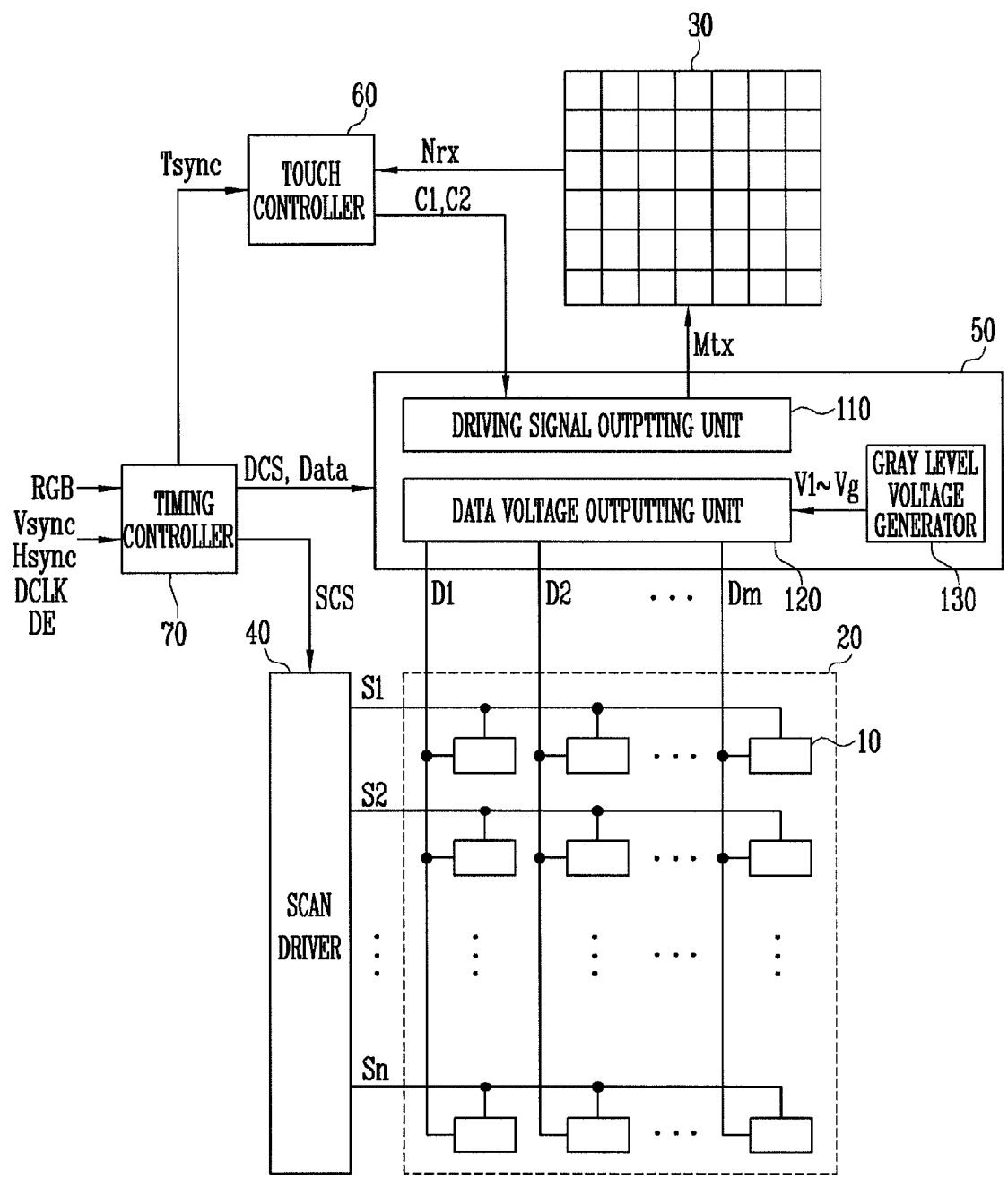
FIG. 1 is a block diagram illustrating a touch screen panel according to an embodiment.

Hereinafter, certain exemplary embodiments are described with reference to the accompanying drawings. Here, when a first element is described as being coupled to a second element, the first element may be directly coupled to the second element or may be indirectly coupled to the second element via a third element. Further, some of the elements that are not essential to the complete understanding of the invention are omitted for clarity. Also, like reference numerals generally refer to like elements throughout. Detailed items of the other embodiments are included in detailed description and drawings.

Certain aspects and characteristics and methods of achieving certain advantages and characteristics are described more fully with reference to the accompanying drawings, in which exemplary embodiments are shown. This invention may, however, be embodied in many different forms and should not be construed as being limited to the embodiments set forth herein. In the drawings, when a part is coupled to another part, the part may, for example, be directly coupled to another part or the part may be electrically coupled to another part with another element interposed. In the drawings, a part that is not related to the current discussion may be omitted for clarity of description. The same reference numerals in different drawings generally represent the same element, and their description may be omitted. Hereinafter, a touch screen panel is described with reference to certain embodiments and the drawings showing certain aspects of the embodiments.

FIG. 1 is a block diagram illustrating a touch screen panel according to an embodiment.

Referring to FIG. 1, the touch screen panel includes a pixel unit 20 including a plurality of pixels 10 coupled to scan lines S1 to Sn and data lines D1 to Dm, a touch sensing unit 30 for sensing touch of a user, a scan driver 40 for supplying scan signals to the pixels 10 through the scan lines S1 to Sn, a data driver 50 for supplying data voltages to the pixels 10 through the data lines D1 to Dm and for supplying driving signals Mtx to the touch sensing unit 30, and a touch controller 60 for detecting sensing signals Nrx output from the touch sensing unit 30 to sense a touch position. In addition, a timing controller 70 for controlling the scan driver 40 and the data driver 50 may be further included. The pixel unit 20 as a region including the plurality of pixels 10 to display an image may overlap the touch sensing unit 30 in order to realize a touch screen function.

The pixels 10 are selected by the scan signals supplied from the scan driver 40. The selected pixels 10 receive data voltages from the data driver 50 to emit light components with brightness components corresponding to the data voltages. The pixels 10 may include organic light emitting diodes (OLED) or liquid crystal (LC) layers so that the pixels 10 may operate as a liquid crystal display (LCD) or an organic light emitting display.

Figure 2:
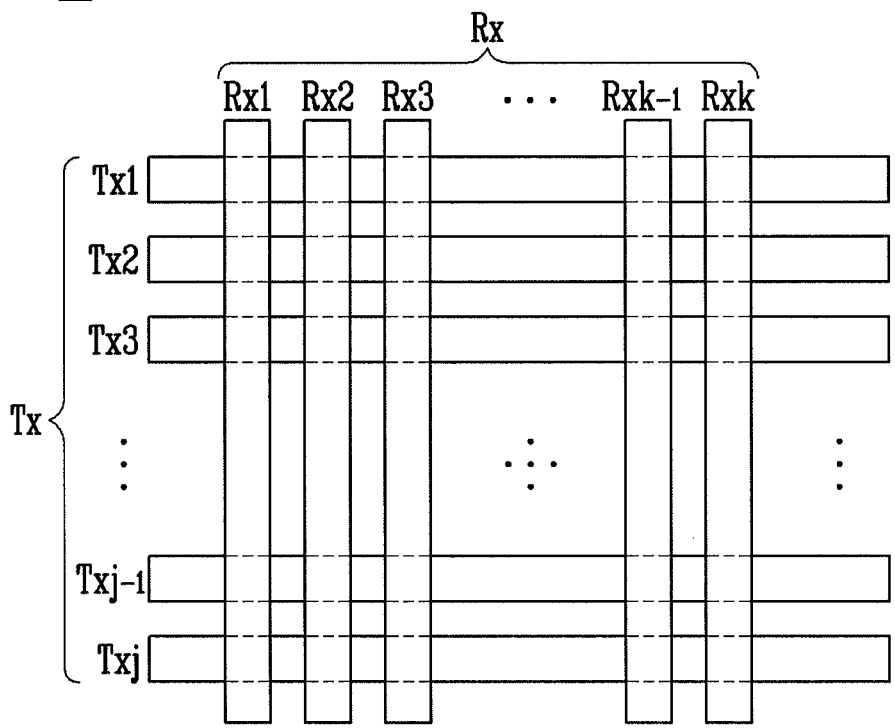
FIG. 2 is a layout view illustrating a touch sensing unit according to an embodiment.

FIG. 2 is a layout view illustrating a touch sensing unit according to an embodiment. The touch sensing unit 30 may be realized by an electrostatic capacity method in order to sense the touch of a user and includes a plurality of driving electrodes Tx that receive the driving signals Mtx and a plurality of sensing electrodes Rx that output the sensing signals Nrx.

The touch sensing unit 30 may be formed to overlap the pixel unit 20 in order to recognize touch input to the pixel unit 20. The driving electrodes Tx and the sensing electrodes Rx that are part of the touch sensing unit 30 may be formed of a transparent conductive material such as indium tin oxide (ITO), indium zinc oxide (IZO), carbon nano tube (CNT), and graphene.

In addition, the shape of the driving electrodes Tx and the sensing electrodes Rx is not limited to the bar shape illustrated in FIG. 2 and may be, for example, a diamond. The driving electrodes Tx and the sensing electrodes Rx may be positioned in the same layer and may be positioned in different layers. In addition, the driving electrodes Tx and the sensing electrodes Rx may intersect each other. For example, in FIG. 2, j driving electrodes Tx1 to Txj and k sensing electrodes Rx1 to Rxk are illustrated.

The scan driver 40 generates scan signals in response to the scan driver control signal SCS of the timing controller 70 and supplies the generated scan signals to the pixels 10 through the scan lines S1 to Sn. For example, the scan driver 40 may sequentially supply the scan signals to the scan lines S1 to Sn.

The data driver 50 may supply data voltages to the pixels 10 in accordance with the data driver control signal DCS of the timing controller 70 in synchronization with the scan signals in units of rows. Therefore, the data driver 50 includes a data voltage outputting unit 120 that receives image data from the timing controller 70 to generate a data voltage corresponding to the image data. For example, the data voltage outputting unit 120 may select a gray level voltage corresponding to corresponding image data from a plurality of gray level voltages V1 to Vg supplied from a gray level voltage generator 130 to output the gray level voltage as the data voltage. The gray level voltage generator 130 may divide the uppermost voltage VDD (refer to FIG. 6) supplied from the outside to generate the plurality of gray level voltages V1 to Vg and may supply the plurality of generated gray level voltages V1 to Vg to the data voltage outputting unit 120.

In addition, the data driver 50 may supply the driving signals Mtx to the driving electrodes Tx of the touch sensing unit 30. Therefore, the data driver 50 may include a driving signal outputting unit 110 that supplies the driving signals Mtx to the driving electrodes Tx. For example, the driving signal outputting unit 110 may supply the driving signals Mtx to the driving electrodes Tx in response to the control signals supplied from the touch controller 60.

The touch controller 60 may measure the sensing signals Nrx (currents or voltages) output from the sensing electrodes Rx to sense a change in electrostatic capacity and to detect a touch position. In addition, the touch controller 60 may supply predetermined control signals to the driving signal outputting unit 110 to control the supply of the driving signals Mtx.

The timing controller 70 may align data RGB supplied from the outside to fit the driving of the pixel unit 20 and may supply the data RGB to the data voltage outputting unit 120 of the data driver 50 as image data. In addition, the timing controller 70 may generate a scan driver control signal SCS and the data driver control signal DCS using a dot clock DCLK, a data enable signal DE, and vertical and horizontal synchronizing signals Vsync and Hsync that are input from the outside and may supply the scan driver control signal SCS and the data driver control signal DCS to the scan driver 40 and the data driver 50 to control the drivers 40 and 50.

Figure 3:
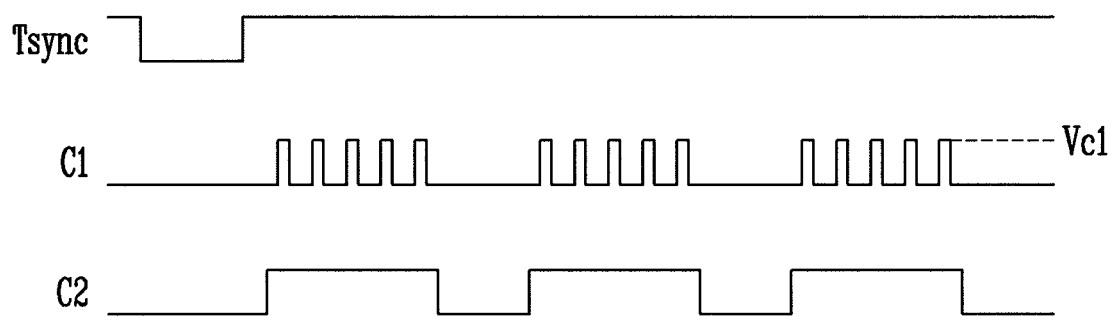
FIG. 3 is a timing diagram illustrating a touch synchronizing signal and control signals according to an embodiment.

FIG. 3 is a waveform chart illustrating a touch synchronizing signal and control signals according to an embodiment. For example, referring to FIG. 3, the touch controller 60 supplies first control signals C1 and second control signals C2 to the driving signal outputting unit 110 when the touch synchronizing signal Tsync is supplied from the outside. The touch synchronizing signal Tsync for determining the start of driving of the touch sensing unit 30 may be supplied from the timing controller 70. In this case, the timing controller 70 and the touch controller 60 are synchronized with each other by the touch synchronizing signal Tsync.

In addition, the first control signals C1 may be signals for determining the frequencies of the driving signals Mtx and the number of driving signals Mtx supplied to the driving electrodes Tx and the second control signals C2 may be signals for determining timing at which the driving electrodes Tx are selected so that the driving signals Mtx may be distributed and supplied to the driving electrodes Tx. The first control signals C1 may be control voltages Vc1.

Figure 4:
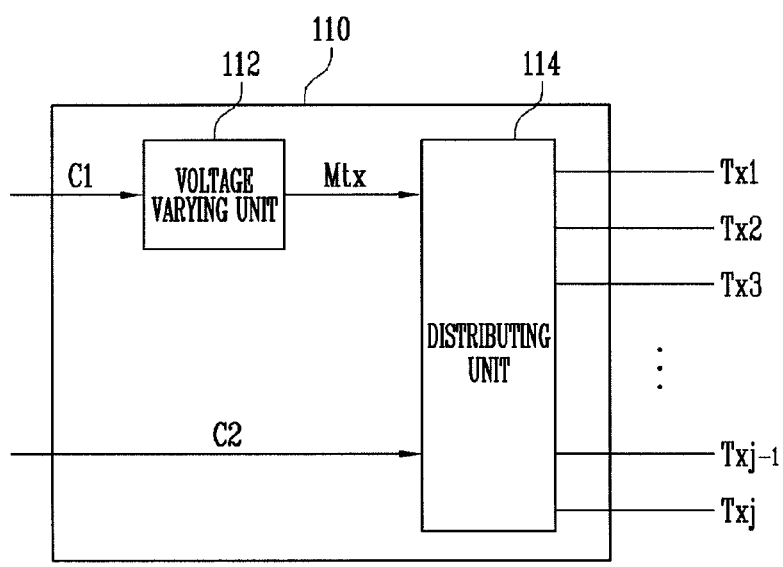
FIG. 4 is a block diagram illustrating a driving signal outputting unit according to an embodiment.
Figure 5:
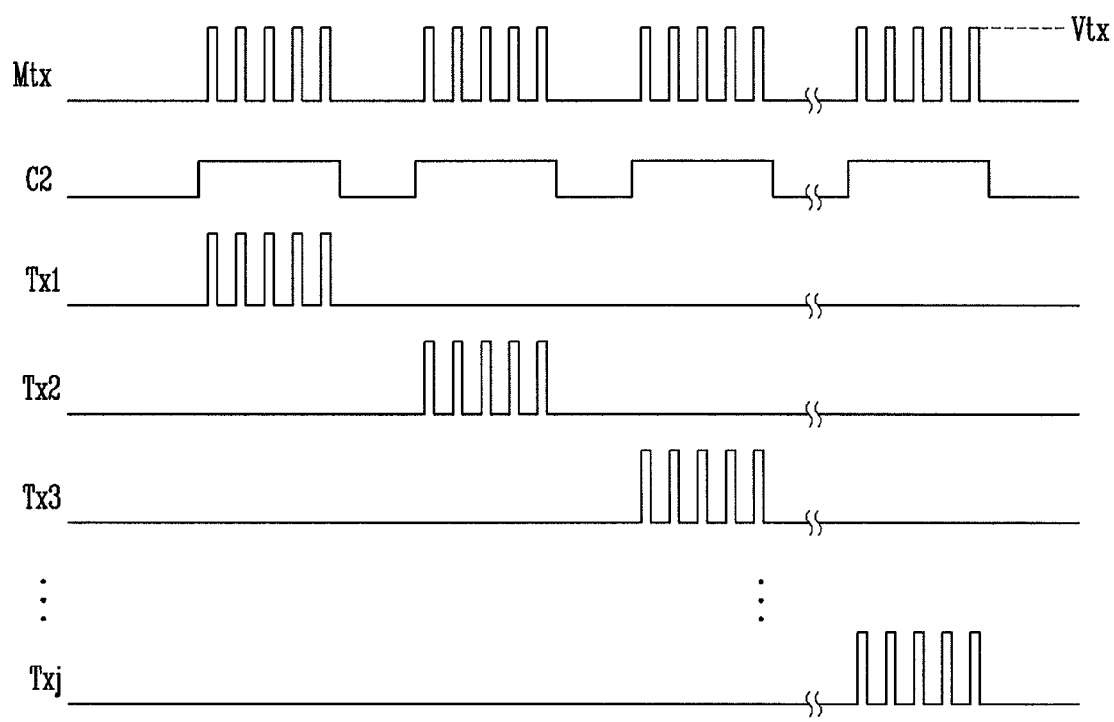
FIG. 5 is a timing diagram illustrating the driving operations of the driving signal outputting unit of FIG. 4.

FIG. 4 is a block diagram illustrating a driving signal outputting unit according to an embodiment. FIG. 5 is a waveform chart illustrating driving operations of the driving signal outputting unit of FIG. 4.

Referring to FIG. 4, the driving signal outputting unit 110 includes a voltage varying unit 112 and a distributing unit 114. The voltage varying unit 112 varies the voltage levels of the first control signals C1 supplied from the touch controller 60 to generate the driving signals Mtx. For example, the voltages Vc1 of the first control signals C1 may be amplified to predetermined voltages Vtx to generate the driving signals Mtx. That is, the driving signals Mtx may be set as the voltages Vtx increased from the voltages Vc1 of the first control signals C1.

The distributing unit 114 distributes the driving signals Mtx generated by the voltage varying unit 112 to the driving electrodes Tx to correspond to the second control signals C2. For example, referring to FIG. 5, the driving signals Mtx supplied to overlap the second control signal C2 may be distributed and supplied to the driving electrodes Tx. Therefore, when the first second control signal C2 starts to be supplied, the driving signals Mtx supplied after the first second control signal C2 are supplied to the first driving electrode Tx1. When the supply of the first second control signal C2 is completed, the supply of the driving signals Mtx is also stopped.

When the second control signal C2 is supplied after a uniform porch period, the driving signals Mtx supplied after the second second control signal Cs are supplied to the second driving electrode Tx2. When the supply of the second second control signal C2 is completed, the supply of the driving signals Mtx is also stopped.

Then, the above processes are repeated to supply the driving signals Mtx to the remaining driving electrodes Tx3 to Txj. The width of the second control signals c2 may be larger than the width of the first control signals C1. In FIG. 5, it is illustrated that five first control signals C1 overlap one second control signal C2. However, the number of overlapping first control signals C1 may vary.

Figure 6:
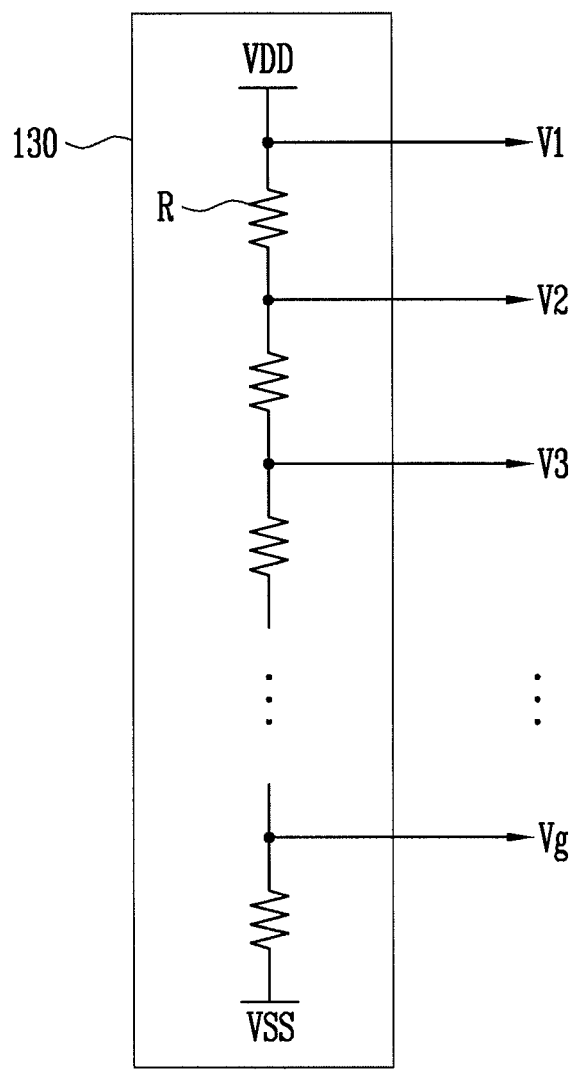
FIG. 6 is a schematic view illustrating a gray level voltage generating unit according an embodiment.

FIG. 6 is a schematic view illustrating a gray level voltage generating unit. The gray level voltage generator 130 may divide the uppermost voltage VDD input from the outside to generate the plurality of gray level voltages V1 to Vg and to supply the plurality of generated gray level voltages V1 to Vg to the data voltage outputting unit 120. For example, referring to FIG. 6, the gray level voltage generator 130 may be realized by a resistor string array including a plurality of serially coupled resistors R. Because of the resistors R between the uppermost voltage VDD and the lowermost voltage VSS, the uppermost voltage VDD may be divided into the plurality of gray level voltages V1 to Vg. In addition, the uppermost voltage VDD and the lowermost voltage VSS may be supplied from a power source supply unit such as a DC-DC converter.

In the touch screen panel according to this embodiment, the voltage varying unit 112 may boost the voltages Vc1 of the first control signals C1 to the uppermost voltage VDD. That is, the voltages Vtx of the driving signals Mtx may be equal to the uppermost voltage VDD.

In this case, since the boosting of the first control signals C1 may be realized using the uppermost voltage VDD used by the gray level voltage generator 130, a boosting circuit is not included for generating the driving signals Mtx.

Figure 7:
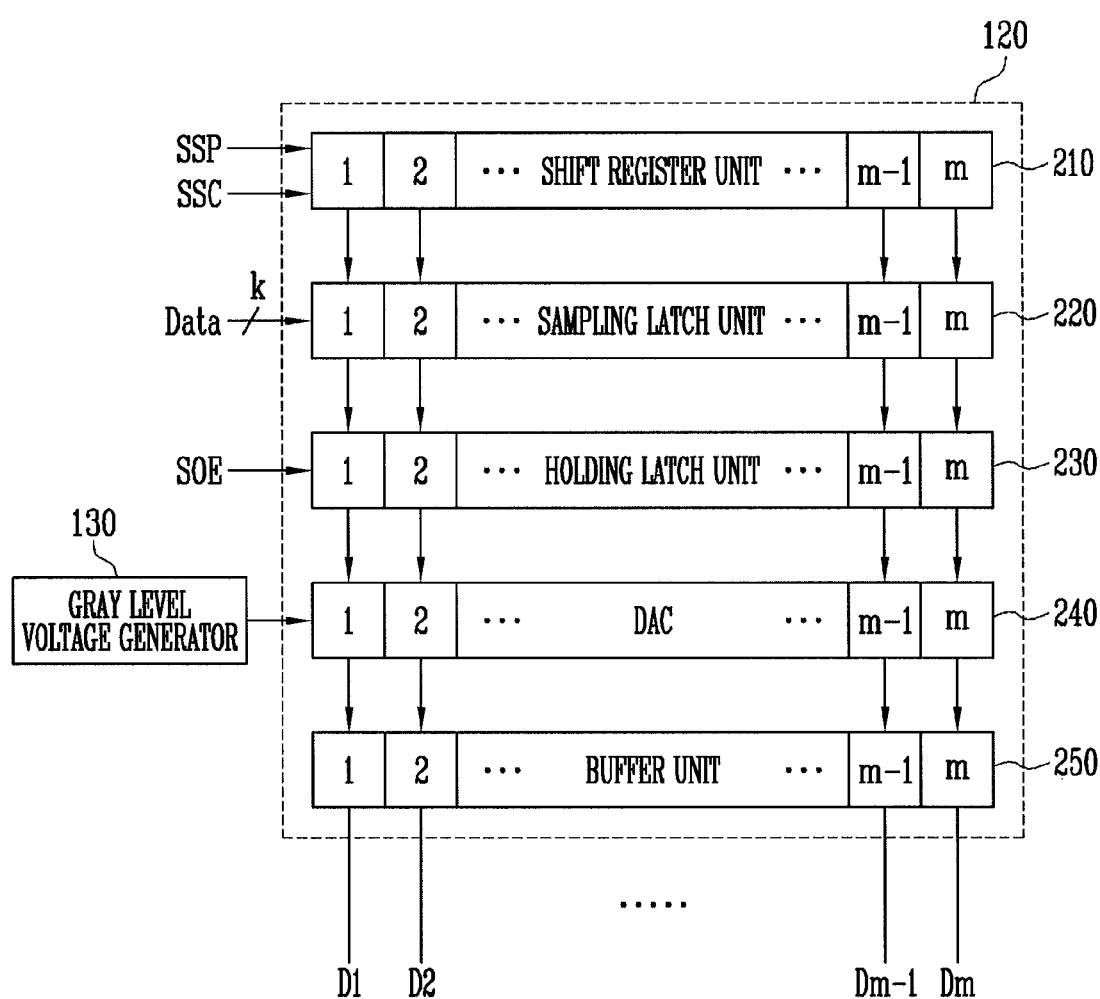
FIG. 7 is a block diagram illustrating a data voltage outputting unit according to an embodiment.

FIG. 7 is a block diagram illustrating a data voltage outputting unit according to an embodiment. Referring to FIG. 7, the data voltage outputting unit 120 includes a shift register unit 210, a sampling latch unit 220, a holding latch unit 230, a digital-to-analog (DA) converter 240, and a buffer unit 250.

The shift register unit 210 receives a source shift clock SSC and a source start pulse SSP from the timing controller 70 and sequentially generates m sampling signals while shifting the source start pulse SSP every one period of the source shift clock SSC. Therefore, the shift register unit 210 includes m shift registers.

The sampling latch unit 220 sequentially stores image data in response to the sampling signals sequentially supplied from the shift register unit 210. The sampling latch unit 220 includes m sampling latches in order to store m digital image data. The sampling latches have a quantity corresponding to the number of bits of image data. For example, when the image data consist of k bits, the sampling latches are set to have the magnitude of k bits.

The source shift clock SSC and the source start pulse SSP may be included in the data driver control signal DCS. The image data may be supplied from the timing controller 70.

The holding latch unit 230 receives image data from the sampling latch unit 220 when a source output enable (SOE) signal is input to store the image data. The holding latch unit 230 supplies the image data stored therein to the DA converter 240 when the SOE signal is input. Here, the holding latch unit 230 includes m holding latches in order to store m image data. In addition, the holding latches have a quantity corresponding to the number of bits of the image data. For example, the holding latches are set to have k bits so that the image data may be stored. The SOE signal may be included in the data driver control signal DCS.

The DA converter 240 generates an analog signal corresponding to the bit value of the input digital image data. The DA converter 240 selects one of the plurality of gray level voltages V1 to Vg output from the gray level voltage generator 130 to correspond to the bit value of the image data supplied from the holding latch unit 230 to generate an analog data signal corresponding to the selected gray level voltage.

The buffer unit 250 supplies m data voltages supplied from the DA converter 240 to the m data lines D1 to Dm. Therefore, the buffer unit 250 includes m buffers corresponding to the data lines D1 to Dm.

While the present invention has been described in connection with certain exemplary embodiments, it is to be understood that the invention is not limited to the disclosed embodiments, but, on the contrary, is intended to cover various modifications and equivalent arrangements.

What is claimed is:

1. A touch screen panel, comprising:
    a pixel unit including pixels coupled to scan lines and data lines;
    a touch sensing unit including driving electrodes and sensing electrodes;
    a scan driver configured to supply scan signals to the pixels through the scan lines;
    a data driver comprising:
        a data voltage outputting unit configured to:
            receive a plurality of gray level voltages,
            generate data voltages based on the gray level voltages and corresponding to image data, and
            supply the data voltages to the pixels through the data lines, and
        a driving signal outputting unit configured to supply a plurality of driving signals to the driving electrodes; and
    a touch controller configured to i) detect sensing signals output from the sensing electrodes and ii) supply a plurality of first control signals to the driving signal outputting unit,
    wherein the driving signal outputting unit is further configured to adjust the frequency and number of the driving signals applied to each driving electrode based on the first control signals,
    wherein the touch controller supplies the first control signals and a plurality of second control signals to the driving signal outputting unit when a touch synchronizing signal is supplied to the touch controller,
    wherein the driving signal outputting unit comprises:
        a voltage varying unit configured to vary voltage levels of the first control signals to generate the driving signals; and
        a distributing unit configured to provide the driving signals to the driving electrodes according to the second control signals,
    wherein the data driver further comprises a gray level voltage generator configured to receive an uppermost voltage and to generate the plurality of gray level voltages based on the uppermost voltage and to supply the generated gray level voltages to the data voltage outputting unit, and
    wherein the voltage varying unit boosts voltage levels of the first control signals to be substantially the same voltage level as the voltage level of the uppermost voltage.

2. The touch screen panel as claimed in claim 1, wherein the data voltage outputting unit comprises:
    a shift register unit configured to sequentially generate sampling signals;
    a sampling latch unit configured to sequentially store the image data according to the sampling signals;
    a holding latch unit configured to temporarily store the image data stored in the sampling latch unit;
    a digital-to-analog (DA) converter configured to:

select gray level voltages corresponding to image data supplied from the holding latch unit, gray level voltages being selected from a plurality of gray level voltages output from the gray level voltage generating unit, and output the selected gray level voltages as data voltages; and a buffer unit configured to transmit the data voltages to the data lines.

3. The touch screen panel as claimed in claim 1, further comprising a timing controller configured to control the scan driver and the data driver.

4. The touch screen panel as claimed in claim 3, wherein the image data are supplied from the timing controller.

5. The touch screen panel as claimed in claim 3, wherein the touch synchronizing signal is supplied from the timing controller.

6. The touch screen panel as claimed in claim 1, wherein a duration of the second control signals is larger than a duration of the first control signals.

7. The touch screen panel as claimed in claim 1, wherein the pixel unit and the touch sensing unit overlap.

8. The touch screen panel as claimed in claim 1, wherein the driving electrodes and the sensing electrodes are formed in different layers.

9. The touch screen panel as claimed in claim 1, wherein the driving electrodes and the sensing electrodes are formed in the same layer.

10. The touch screen panel as claimed in claim 1, wherein the driving electrodes and the sensing electrodes cross each other.

* * * * *